US007874587B2

(12) United States Patent
Miki et al.

(10) Patent No.: US 7,874,587 B2
(45) Date of Patent: Jan. 25, 2011

(54) GLOVE BOX ASSEMBLY EXHIBITING KNEE IMPACT FORCE TRANSFERRING STRUCTURE WITH RESPECT TO AN ASSOCIATED VEHICLE DASH/INSTRUMENT PANEL AND REINFORCING BAR AND INCLUDING REMOVABLE STRENGTHENING RIBS FOR TUNING OF CRASH SAFETY CHARACTERISTICS

(75) Inventors: Jeffrey Sadao Miki, Ann Arbor, MI (US); Benjamin Warren Penner, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 201 days.

(21) Appl. No.: 12/013,131

(22) Filed: Jan. 11, 2008

(65) Prior Publication Data

US 2008/0106110 A1  May 8, 2008

Related U.S. Application Data

(63) Continuation-in-part of application No. 11/349,503, filed on Feb. 7, 2006, now Pat. No. 7,484,792.

(51) Int. Cl.
 *B60R 21/045* (2006.01)
(52) U.S. Cl. ....................................................... 280/752
(58) Field of Classification Search ................. 280/752; 180/90; 296/187.05, 37.12, 70, 193.02
 See application file for complete search history.

(56) References Cited

U.S. PATENT DOCUMENTS

| 4,109,955 | A | 8/1978 | Amann et al. |
| 4,427,215 | A | 1/1984 | Weichenrieder et al. |
| 4,518,172 | A | 5/1985 | Bortz et al. |
| 5,071,162 | A | 12/1991 | Takagawa et al. |
| 5,295,707 | A | 3/1994 | Satoh et al. |
| 5,482,319 | A | 1/1996 | Yoshimura et al. |
| 5,810,414 | A | 9/1998 | Choquet et al. |
| 5,904,389 | A | 5/1999 | Vaishnav et al. |
| 6,070,927 | A | 6/2000 | Mieglitz et al. |
| 6,299,208 | B1 * | 10/2001 | Kasahara et al. ............ 280/752 |
| 6,896,308 | B2 | 5/2005 | Okanda et al. |
| 7,484,792 | B2 * | 2/2009 | Penner .................. 296/187.05 |
| 2003/0129418 | A1 | 7/2003 | Tamura |
| 2004/0041385 | A1 | 3/2004 | Garnweidner et al. |

(Continued)

FOREIGN PATENT DOCUMENTS

JP            06087391          3/1994

*Primary Examiner*—Faye M. Fleming
(74) *Attorney, Agent, or Firm*—Gifford, Krass, Sprinkle, Anderson & Citkowski, P.C.

(57) ABSTRACT

A glove box assembly incorporated into a vehicle instrument panel, along which extends a reinforcing bar. A three-dimensional and interiorly open receptacle is fixedly mounted within the instrument panel. The receptacle includes integrally formed structural projections extending from a rear side thereof and in a direction towards the reinforcing bar. A plurality of ribs are attached to the receptacle proximate the projections and in order to adjust a deformation characteristic of the receptacle. A bin secures within said glove box receptacle and includes a door exposed to adjoining surfaces of the instrument panel. Upon experiencing a collision event resulting in a passenger's knees impacting the door, inward deformation of the receptacle transfers forces both to the instrument panel and through deforming the reinforcing bar.

19 Claims, 8 Drawing Sheets

U.S. PATENT DOCUMENTS

| | | |
|---|---|---|
| 2004/0124623 A1 | 7/2004 | Yamazaki |
| 2005/0062276 A1 | 3/2005 | Nagata et al. |
| 2005/0194773 A1 | 9/2005 | Yamada et al. |
| 2006/0038390 A1 | 2/2006 | Cho |
| 2006/0232055 A1* | 10/2006 | Cappabianca et al. ....... 280/752 |
| 2007/0182145 A1 | 8/2007 | Penner |
| 2007/0205624 A1 | 9/2007 | Zellner et al. |

* cited by examiner

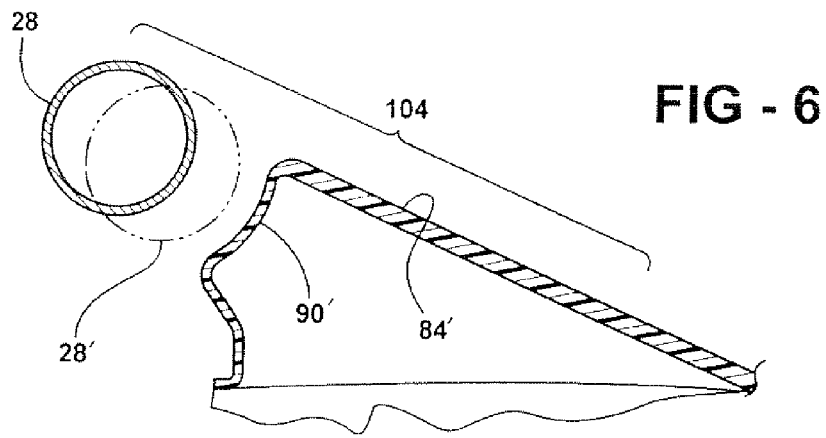
FIG - 6
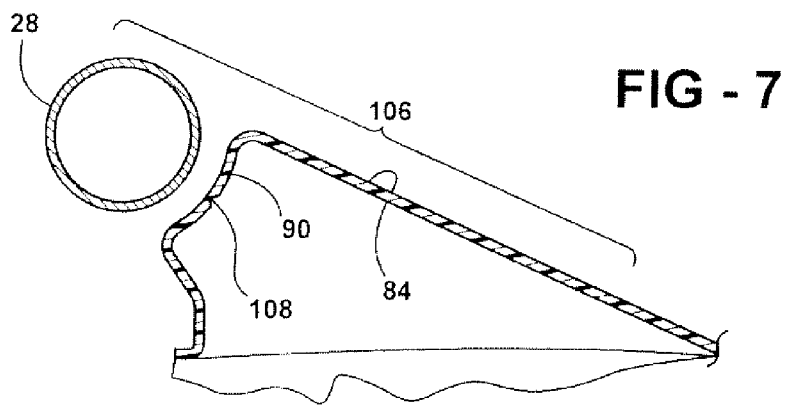
FIG - 7
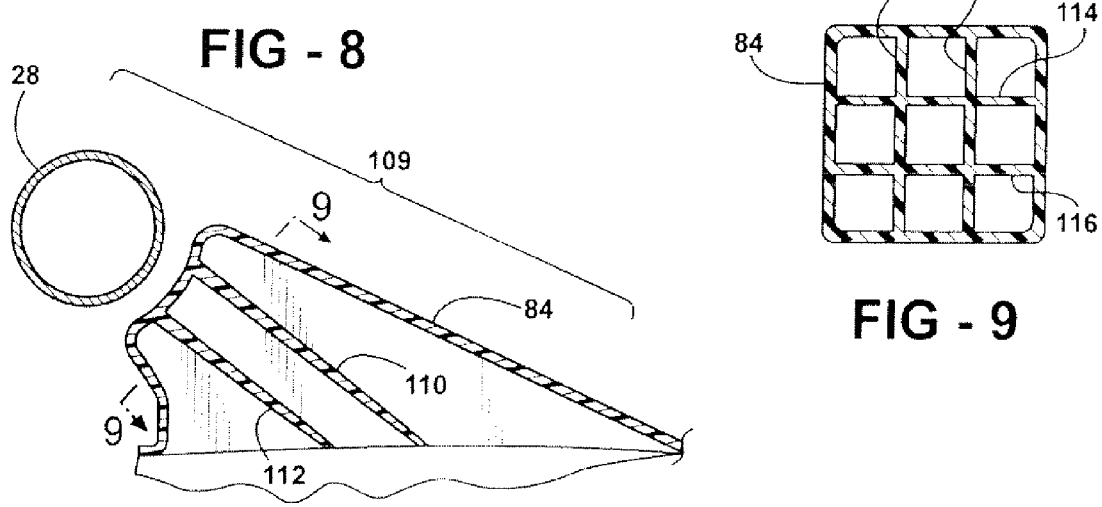
FIG - 8
FIG - 9

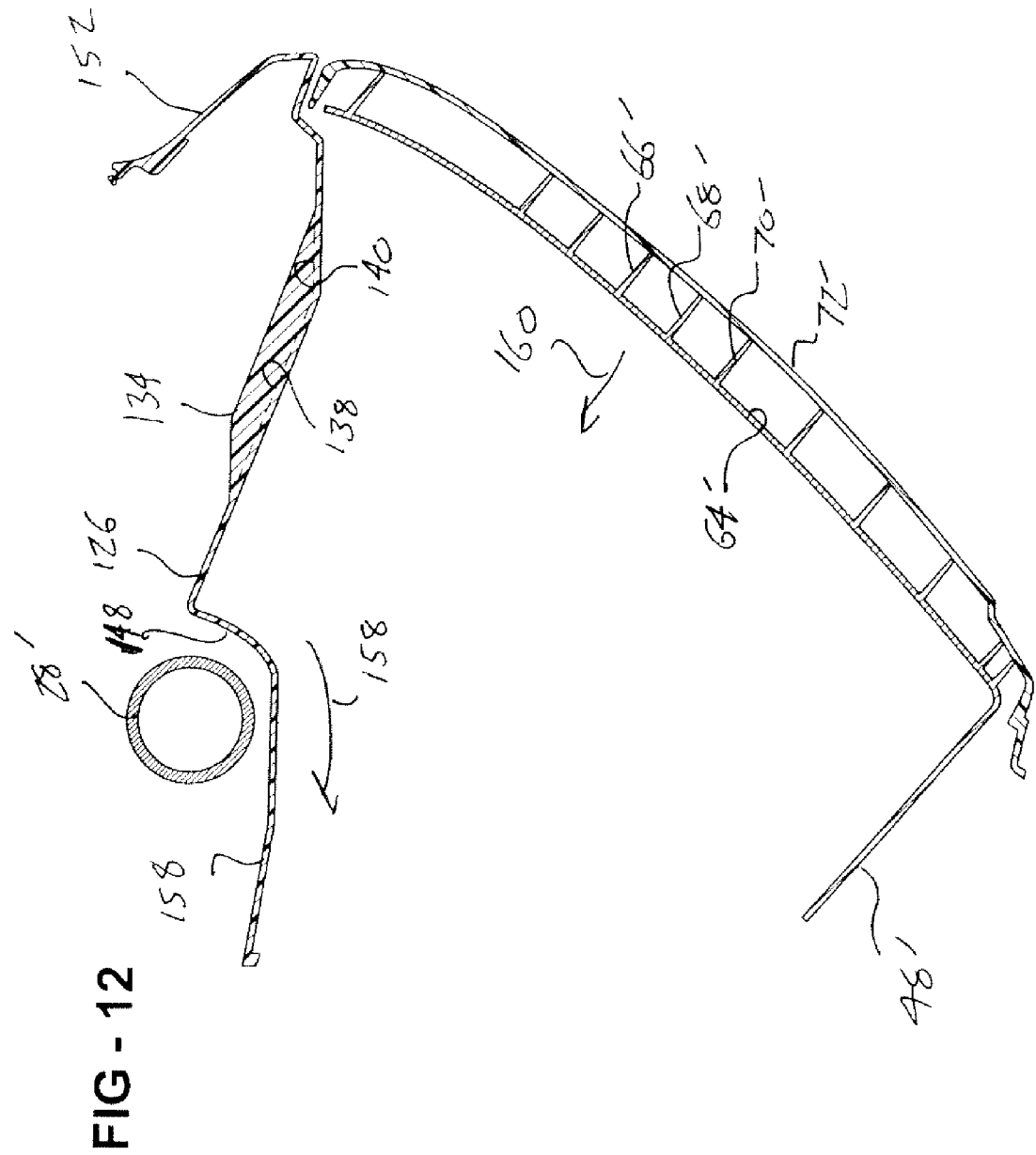

US 7,874,587 B2

GLOVE BOX ASSEMBLY EXHIBITING KNEE IMPACT FORCE TRANSFERRING STRUCTURE WITH RESPECT TO AN ASSOCIATED VEHICLE DASH/INSTRUMENT PANEL AND REINFORCING BAR AND INCLUDING REMOVABLE STRENGTHENING RIBS FOR TUNING OF CRASH SAFETY CHARACTERISTICS

This application is a Continuation-in-part of application Ser. No. 11/349,503 filed on Feb. 7, 2006, entitled. GLOVE BOX ASSEMBLY EXHIBITING KNEE IMPACT FORCE TRANSFERRING STRUCTURE WITH RESPECT TO AN ASSOCIATED VEHICLE DASH/INSTRUMENT PANEL AND REINFORCING BAR

FIELD OF THE INVENTION

The present invention relates generally to a passenger side located glove box assembly exhibiting specific impact deforming and force transferring properties. More specifically, the present invention discloses a glove box assembly including a three-dimensional recessed component mounted within the vehicle dash/instrument panel assembly.

Upon experiencing forward directed forces, associated with the passenger's knees impacting a door of the glove box, these forces are initially transferred to the surrounding and supporting instrument panel structure. Additional forwardly directed impact forces are transferred from extending structural portions associated with the glove box inner receptacle, upon the same being forwardly deformed into abutting contact with the vehicle's laterally extending structural reinforcing bar.

A plurality of ribs are secured along a top surface of the inner receptacle, at locations associated with each of a plurality of individually configured and spaced apart structural projections. The ribs are also envisioned to be removable, such as by selectively and resistively fitting into slots or channels defined in the top surface of the receptacle, and in order to adjust the crash safety characteristics of the inner receptacle at given widthwise extending locations.

In this manner, the structural projections associated with the glove box's fixed inner receptacle serve to transfer significant load during a crash situation to non-critical vehicle locations supporting the reinforcing bar, such as the doors, steering column support and the like. A further advantage of this design is that it provides balance between the counter-forces exerted by a passenger actuating airbag (upper torso forces) and those responsible for the controlled deformation and lower collapse of the glove box door and inner assembly (lower body forces).

DESCRIPTION OF THE PRIOR ART

The prior art is well documented with various occupant knee impact assemblies, these typically associated with a passenger side of a vehicle and calculated to transfer lower body forces associated with a frontal impact event. The objective of such designs is to transfer as much force as possible away from the occupant to the vehicle, in as controlled a fashion as possible and in order to minimize injury.

Conventional bracket structures have been utilized in an attempt to transfer impact forces from the glove box assembly to the IP/dash structure and associated crosswise extending reinforcing bar. Such have included striker brackets and other connecting flange assemblies, the shortcomings of which include the requirement of installing additional hardware as well as the unsatisfactory force deformation and redirection results associated with such designs.

Another example selected from the prior art is disclosed in U.S. Patent Application Publication No. 2004/0124623, to Yamazaki, and which teaches an occupant protection apparatus exhibiting a panel constituting part of a passenger compartment side of an instrument panel, and which is separatable from the IP (instrument panel). The panel is constructed to move (deform) when at least a knee load of an occupant is inputted.

A pair of bracket shaped support members extend in inwardly spaced apart arrangement and between transverse end portions of the panel and a crosswise extending reinforcement. The support members exhibit a rigidity greater than that of the panel and, upon experiencing forward forces associated with a frontal impact, provide additional controlled deformation following inward collapse of the panel, and relative to the rigid extending reinforcing support.

A further example from the prior art is disclosed in U.S. Pat. No. 6,783,156, issued to Chickmenahalli et al., and which teaches a passenger restraint including a knee bolster having receptacles for receiving knee blockers. The knee blockers are multi-celled elements which absorb kinetic energy attributed to collisions of a motor vehicle.

U.S. Pat. No. 5,431,442, issued to Tomita et al., teaches a passenger restraint structure for an automotive vehicle which has a glove box in which at least one face is able to be opened to a passenger compartment and which is attached to an instrument panel so as to be opposed to the knees of a passenger. The glove box includes an intermediate wall connecting a front wall and a rear wall of the glove box. A stiffener member is located between the glove box and a part of a vehicle body and is stiffer than the glove box for absorbing crash energy generated between the passenger and the vehicle body in the running direction of the vehicle. Upon impact, the weaker intermediate wall of the glove box is compressed, deformed and broken, thereby absorbing the crash energy.

U.S. Pat. No. 4,662,649, issued to Ikeda et al., teaches a knee protector in an automobile and which includes an instrument panel arranged in front of a seat within a passenger compartment of the automobile and exiting widthwise of the automobile. The IP includes an opening, defined therein, a lid similar in shape to the contour of the opening is supported by the instrument panel for selective closing and opening. A first protector member is provided inside the lid, a pair of pin members being spaced a distance from each other in a direction widthwise of the automobile and secured to the first protector member so as to protrude in a direction close towards the instrument panel. A second protector member is provided inside the instrument panel and includes separate engagement regions defined therein for engagement with the respective pin members when a load acting in a direction frontwardly of the automobile acts on the lid.

Finally, U.S. Pat. No. 5,071,162, issued to Takagawa, teaches a knee bolster including a lid for covering the surface of a glove box mounted in an opening made in a surface of an instrument panel opposed to a passenger's knees and which includes a plate-like shock absorbing member mounted thereon. A reinforcing plate is disposed along the peripheral edge of the opening and opposed to an outer edge of the back of the shock absorbing member. A load bearing member is fixed at one end thereof to a vehicle body and opposed at the other end to the back of the reinforcing plate.

SUMMARY OF THE PRESENT INVENTION

The present invention discloses a glove box assembly including a three-dimensional item holding bin and an associated glove box door, hingedly secured relative to a three-dimensional receptacle fixedly mounted within the surrounding vehicle dash/instrument panel assembly. In particular, the IP mounted glove box receptacle includes at least one depthwise extending structural projection spatially arrayed relative to an instrument panel reinforcing bar extending in crosswise fashion beneath the IP and structurally connected to both interior and side locations of the vehicle body (e.g. frame, passenger side airbag, doors, etc.), as well as structurally interconnecting the vehicle steering column.

Upon experiencing a forward directed force, associated with a collision event and resulting in the passenger's knees impacting a door of the glove box, these forces are initially transferred to the surrounding and supporting instrument panel structure within which the fixed glove box inner receptacle is mounted. Additional forwardly directed impact forces are transferred from the extending structural portions, upon the same being forwardly deformed into abutting contact with the vehicle's laterally extending structural reinforcing bar and following a given degree of initial deformation of the surrounding instrument panel.

A plurality of ribs are secured along a top surface of the inner receptacle, at locations associated with each of a plurality of individually configured and spaced apart structural projections. The ribs are also envisioned to be removable, such as by selectively and resistively fitting into slots or channels defined in the top surface of the receptacle, and in order to adjust the crash safety characteristics of the inner receptacle at given widthwise extending locations.

In this manner, the structural projections associated with the glove box's fixed inner receptacle operate to deform the reinforcing bar at the points of contact and to transfer significant loads to the non-critical structural support locations to which the reinforcing bar secures. A further advantage of this design is that it provides balance between the counter-forces exerted by a passenger actuating airbag (upper torso forces) and those responsible for the controlled deformation and lower collapse of the glove box door and inner assembly (lower body forces). The deformable glove box assembly further operates to offset the absorptive force requirements associated with an upper body situated vehicle airbag, thereby balancing the individual absorptive requirements of both the airbag and glove box situated opposite the upper and lower body, respectively, of the user.

BRIEF DESCRIPTION OF THE DRAWINGS

Reference will now be made to the attached drawings, when read in combination with the following detailed description, wherein like reference numerals refer to like parts throughout the several views, and in which:

FIG. 6 is a partial cutaway illustration showing an alternate configuration whereby a spacing established between the fixed glove box receptacle and reinforcement bar is modified, and/or by which a thickness associated with a given surface of the receptacle protections is modified;

FIG. 7 is a further partial cutaway illustration of another alternate configuration and by which an impacting surface of the receptacle projecting structure is inwardly notched to facilitate a degree of controlled collapse of the hollow interior structure concurrent with exerting a determined deforming force upon the reinforcing bar;

FIG. 8 is a still further partial cutaway illustration of an additional ribbing structure incorporated into the otherwise hollowed interior of the receptacle and integrally molded projecting structure and in order to selectively strengthen the interior of the receptacle structure proximate the impact point with the reinforcement bar;

FIG. 9 is a cutaway view taken along line 9-9 of FIG. 8 and illustrating the interior honeycomb structure of the fixed receptacle structural projections;

FIG. 12 is a cutaway view taken along line 12-12 of FIG. 11 and further illustrating an assembled side profile of the glove box assembly with a selected and removable rib associated with a given rearward structural projection in turn arranged in incrementally spaced and opposing fashion relative to the surface of the IP reinforcing bar.

DETAILED DESCRIPTION OF THE PREFERRED EMBODIMENTS

Figure 1:
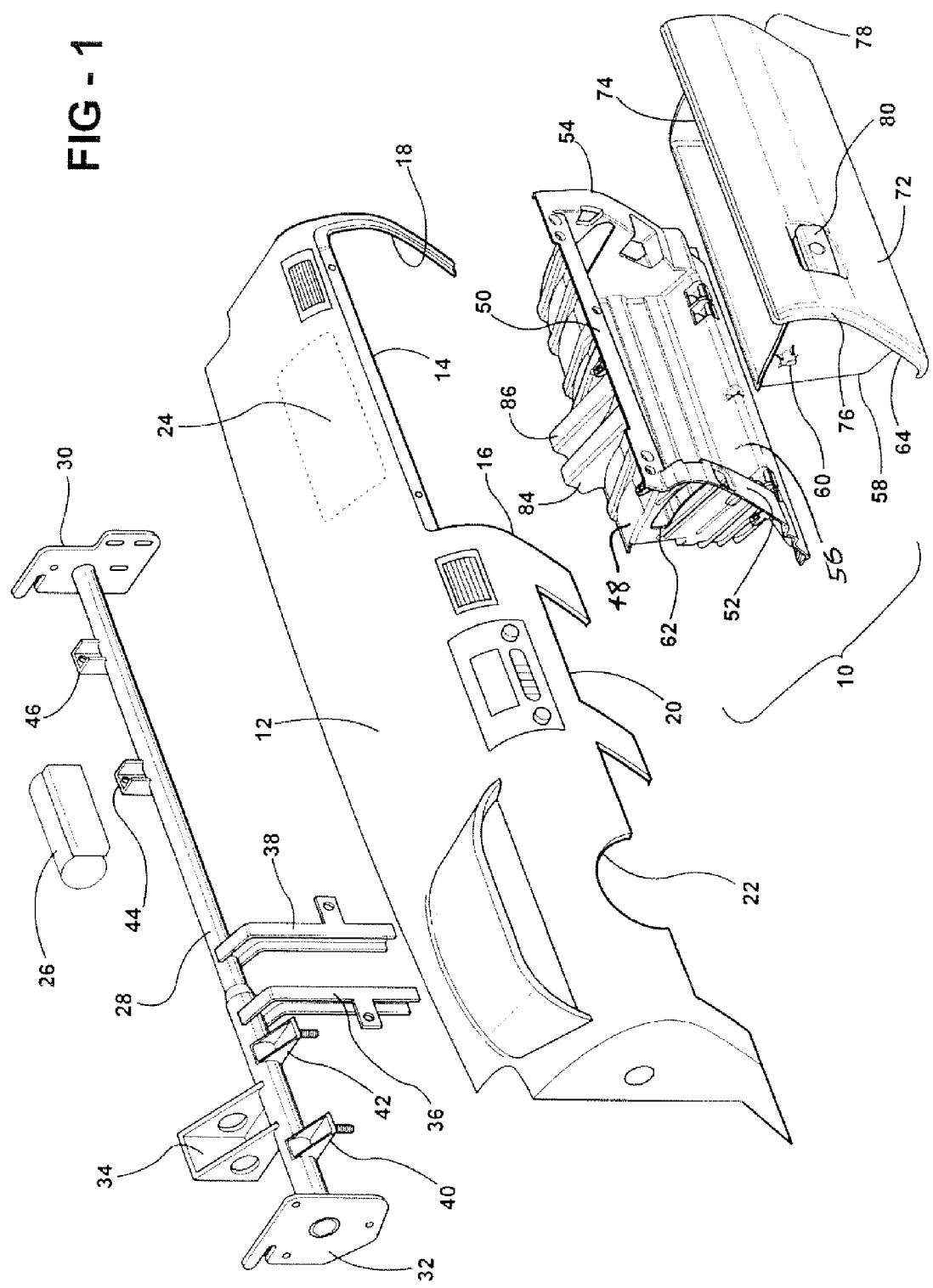
FIG. 1 is an exploded view including the inner structurally configured and outer pivotally secured components of the glove box assembly, the vehicle dash/IP assembly, and its crosswise extending and structurally reinforcing bar.

Referencing now FIG. 1, a glove box assembly is generally referenced at 10 for incorporation into a vehicle instrument panel 12 according to the present invention. As will be subsequently described in further detail, the glove box 10 incorporates a force transferring structure which, in response to a vehicle occupant's knees impacting the glove box, distributes the forces away from the occupant's body, and either alone or in tandem with an upper body actuating and passenger side mounted airbag.

Referring again to FIG. 1, the instrument panel 12 designation generally references the vehicle dash, which references locations including glove box mounting surfaces 14, 16 and 18, ashtray or center console mounting surfaces 20, and steering column mounting location 22. Illustrated in phantom at 24 in FIG. 1 is an outline of a mounting position of a passenger side airbag, also shown in three dimension at 26, and which is secured within the instrument panel 12 interior in such a fashion to be exteriorly deployed in the event of a frontal collision.

A reinforcing bar is referenced at 28 and is secured in widthwise extending fashion along the interior of the instrument panel 12. The reinforcing bar 28 secures at a number of locations to both structural positions associated with the vehicle and other associated components and, as will be subsequently described, is designed to be deformed by the inward collapsing of the glove box in order to increase the force dissipating value of the glove box design.

Referring again to FIG. 1, the reinforcing bar 28 includes first end 30 and second end 32 brackets, such as which are welded to the bar, and which secure in turn to body locations of the vehicle (not shown), such as in particular structural locations associated with the vehicle doors. A further intermediate body securing location is referenced by flange 34 welded or otherwise integrally formed with the bar 28, as well as spaced apart and center console support flanges 36 and 38.

Yet additional support structure is referenced at 40 and 42, extending from other locations of the reinforcing bar 28 proximate the body securing flange 34, and to which is secured an associated steering column structure (not shown) and which projects through the configured mounting location 22 referenced in instrument panel. Finally, the reinforcing bar includes a pair of spaced attachment brackets, see at 44 and 46, to which is supported the associated mounting locations of the passenger side mounted airbag 26.

Figure 2:
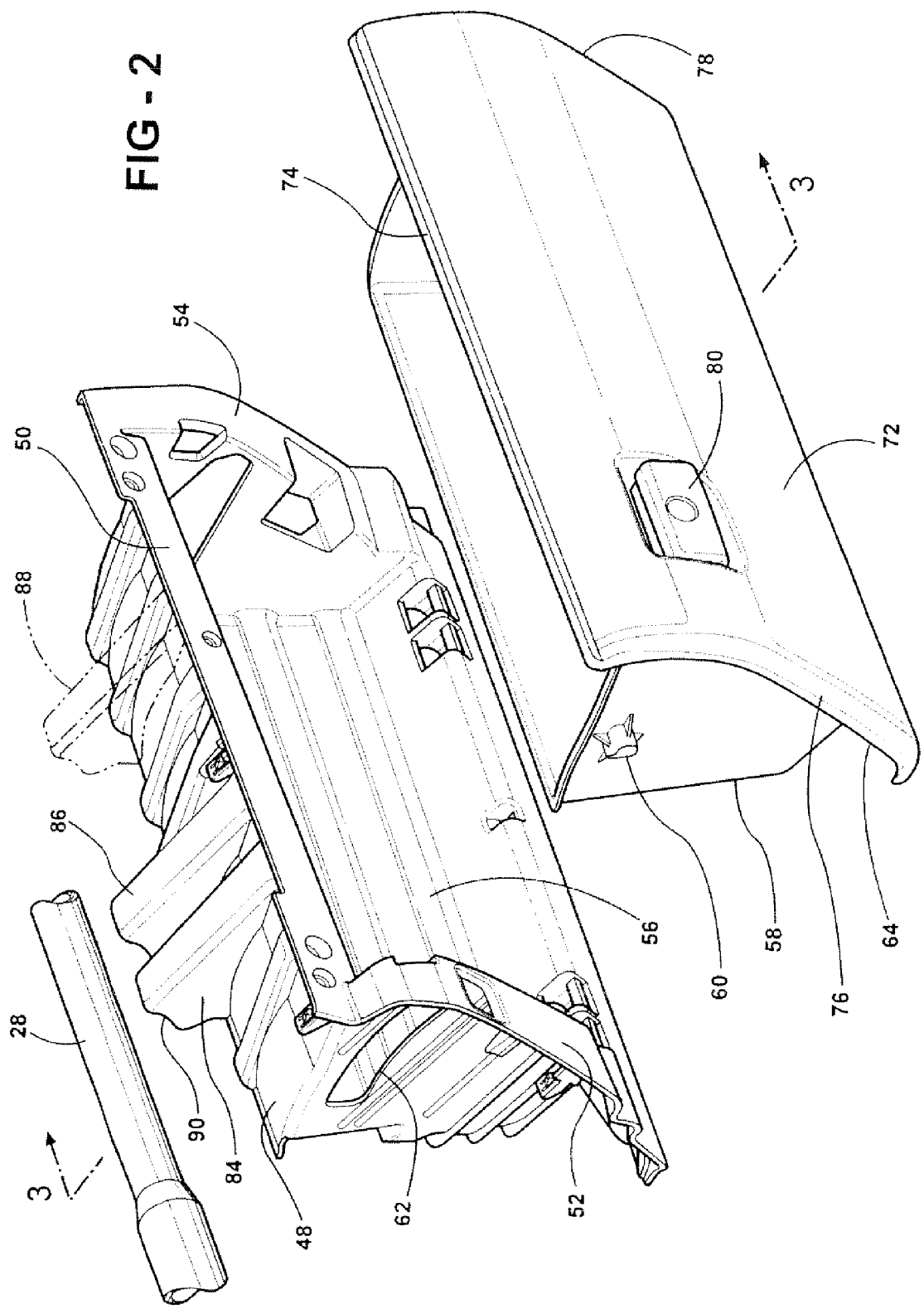
FIG. 2 is an enlarged illustration taken from FIG. 1 and in particular showing the architectural structure of the fixedly mounted inner receptacle with its integrally formed projections.

The glove box assembly 10, as referenced again in FIG. 1 in cooperation with the succeeding enlarged perspective view of FIG. 2, includes a three-dimensional receptacle 48 secured to the instrument panel defined support surfaces 14, 16, and 18, and such that interconnecting outer rim locations 50, 52, and 54 are secured in a desired arrangement within the instrument panel geometry. The receptacle defines an inwardly open interior 56, dimensioned to receive an associated article supporting bin 58 and, along with the bin and its associated door, is constructed of a material such as polypropylene in an injection molding process.

The bin 58 includes at least one side protecting support see at 60 in FIGS. 1 and 2, and which establishes stop locations in cooperation with a side disposed channel 62 formed within a side of the receptacle 48, and upon the bin 58 being pivotally actuated outwardly from a recessed and latched arrangement within the dashboard to an exposed and opened location whereby the interior contents of the open bin are accessible.

Figure 3:
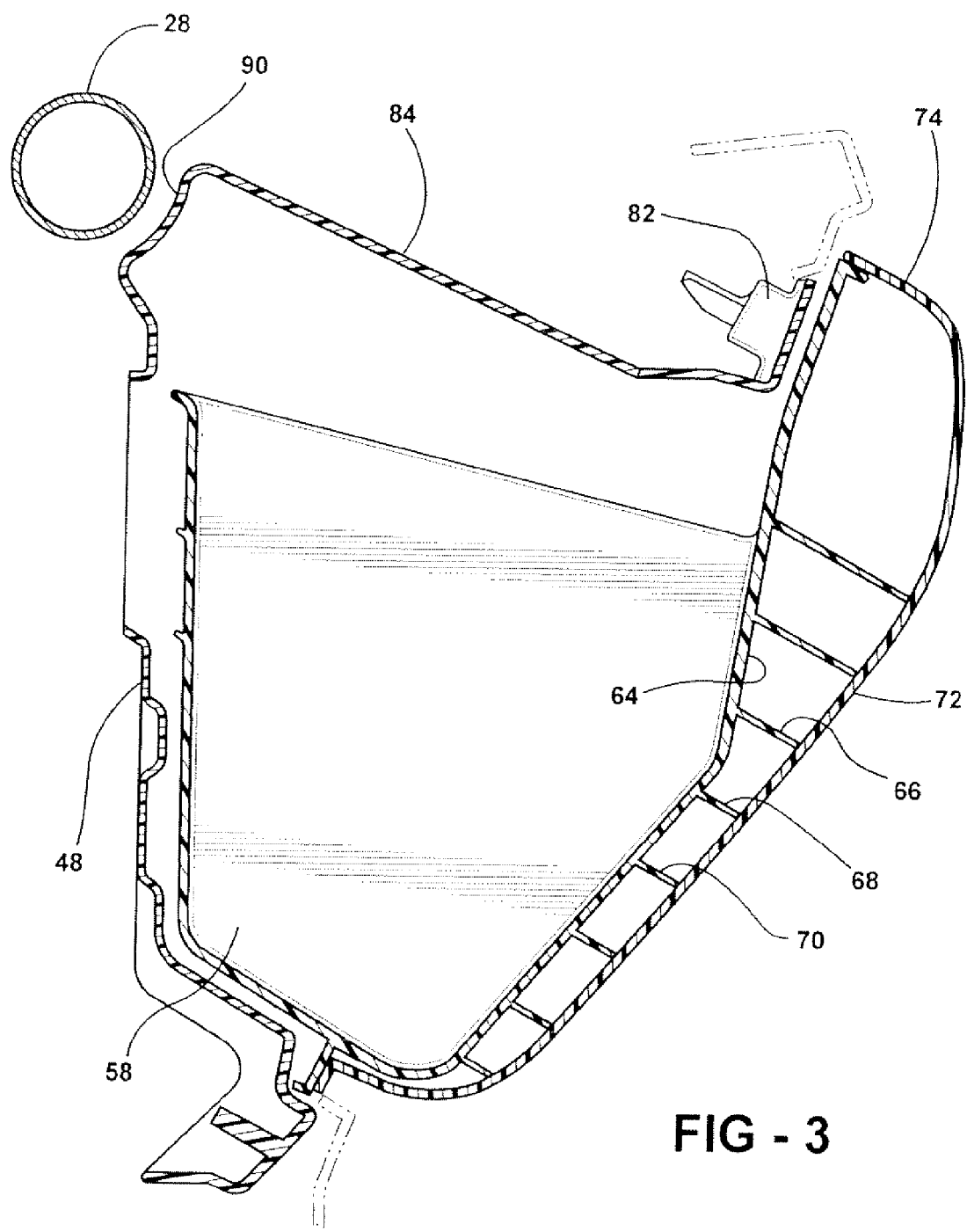
FIG. 3 is a cutaway view taken along line 3-3 FIG. 2 and illustrating an assembled side profile of the glove box assembly, again showing the rearward structural projections in incrementally spaced and opposing fashion relative to the surface of the IP reinforcing bar.

A door associated with the bin 48 and includes an inner panel 64, see also side cutaway of FIG. 3, and which is secured against locations associated with a forward edge of the bin. As with the bin, the inner panel 64 is typically constructed of a plasticized material formed in an injection molding process and such that the panel 64 exhibits a modified/arcuate planar configuration with a specified length, width and thickness, and generally corresponding to a dimensioned opening in the vehicle dashboard.

The inner panel 64 further includes a plurality of spaced apart and projecting support/stiffening ribs 66, 68, 70, et seq. These are arranged in opposing fashion relative to an outer panel 72, corresponding in overall shape and size to the inner panel 64, and in order that the inner and outer panels are vibrationally welded together, such as along contacting edges of the ribs 66, 68, 70, et seq. against an inner surface of the outer panel 72.

The outer panel 72 may further include inwardly contoured edges 74, 76 and 78, and in order to define a seamless welded construction with the inner panel 64. The outer panel 72 further includes a handle mechanism 80 incorporated into a forward recess associated with the panel 72 and which, in cooperation with a release and force dampening cylinder (not shown) and an interiorly secured and side latch pin type gear box (also not shown) actuates the door and associated bin relative to structure extending from a side of the glove box assembly and communicating with a release/catch latch 82 (see FIG. 3) associated with the upper forward edge 50 of the recessed open receptacle 48.

Figure 4:
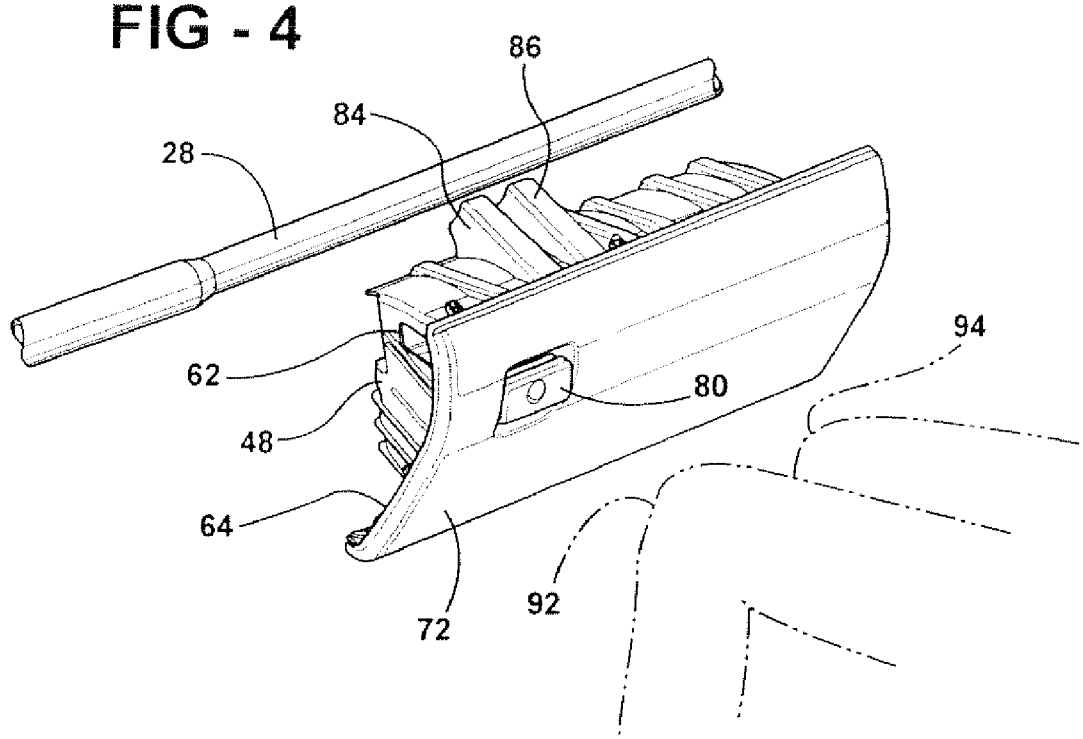
FIG. 4 is an environmental view showing only the glove box assembly and reinforcing bar in pre-impact condition.
Figure 5:
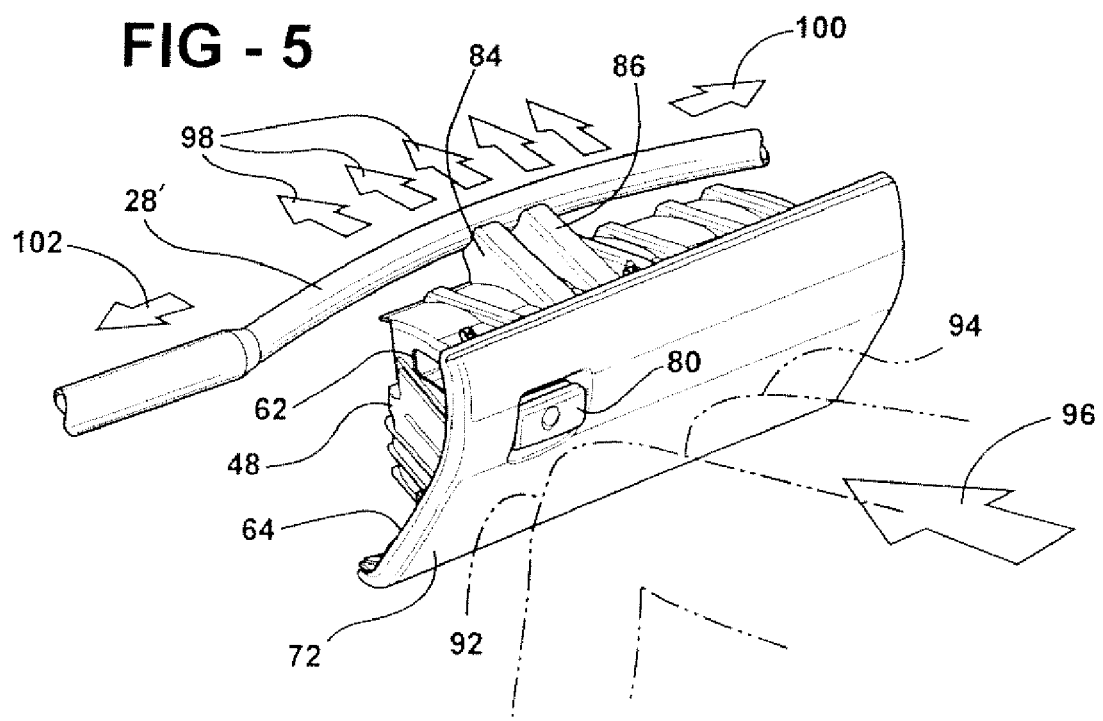
FIG. 5 is a successive environmental view to that shown in FIG. 4 and illustrating the inward travel of the glove box assembly, resulting in successive deformation of the reinforcing bar.

In its assembled configuration, and as is best shown by side cutaway view of FIG. 3 and succeeding environmental views FIGS. 4 and 5, the supported glove box receptacle 48 includes any number of rearward/inward structural projections, see at 84 and 86 in solid in FIG. 2, as well as optionally/additionally in phantom illustration at 88. These projections each define integral extending portions of the inner receptacle 48, and which is interiorly hollowed within the projections.

Upon assembly, again referencing FIG. 3, each of the individual structural projections (or rearward embossments), includes an inwardly arcuately profiled end surface, see as exemplary shown by inner arcuate end surface 90 associated with rearward structural embossment 84. In a desired embodiment, the receptacle 48 is not secured in any fashion to the reinforcing bar 28, but rather the profiled end surfaces (e.g. at 90) associated with each structural receptacle projection are spaced a desired distance (in one variant approximately 8 mm distance) from the surface of the reinforcement bar 28.

The configuration of the projection end surfaces is such that they substantially mate with the exterior extending configuration of the reinforcing bar 28. As shown in FIG. 5, and upon a determined forward impact event corresponding to an occupant's knees 92 and 94 contacting the door in a direction generally referenced by arrow 96, these forces are initially transferred to the structure of the instrument panel 12 surrounding the mounting locations associated with the glove box assembly.

Upon the glove box (in particular the inner fixed mounted receptacle 48) being inwardly collapsed a desired distance (and again such as the 8 mm separating the reinforcing bar 28 from the rearward embossments/projections 84 and 86), the inner arcuate ends of the structural projections contact the associated exterior surface locations of the bar 28. Following this contact, continued collapse of the glove box results in the bar 28 being bent, or deflected, in the manner referenced by bar 28' in FIG. 5. The impact forces are transferred, both forwardly as shown at 98 in FIG. 5, as well as laterally, see at 100 and 102, respectively, to a number of locations structurally associated with the reinforcing bar 28, these again including the side door mounting locations 30 and 32, additional vehicle mount locations 34, 36 and 38, as well as the steering column mounting locations 40 and 42.

In this manner, the structural projections associated with the glove box's fixed inner receptacle 48 operate to deform the reinforcing bar 28 at the points of contact, and to thereby transfer significant loads to the non-critical structural support locations to which the reinforcing bar secures. As previously described, a further advantage of the present design is that it provides balance between the counter-forces exerted by a passenger actuating airbag 26 (upper torso forces) and those responsible for the controlled deformation and lower collapse of the glove box door and inner assembly 10 (lower body forces).

The deformable glove box assembly 10 operates to offset the absorptive force requirements associated with an upper body situated vehicle airbag, thereby balancing the individual absorptive requirements of both the airbag and glove box situated opposite the upper and lower body, respectively, of the user. The construction of the glove box door (e.g. inner panel 64 and outer vibration welded panel 72) is such that the door is sufficiently stiff in order to absorb an amount of impact energy and to prevent the occupant's knees 92 and 94 from contacting any overly hard surface.

In a preferred embodiment, it is desired to maintain the substantial structural integrity of the rearward structural projections 84, 86, et seq., associated with the fixed and inner glove box receptacle 48, this facilitating transferring of energy through the reinforcement bar 28, both subsequently and concurrently with additional impact forces being exerted across the instrument panel structure 12 and away from the occupant. As will now be described, there are also envisioned instances in which it is desired to modify the structural performance characteristics of the glove box receptacle 48 (i.e. its rearward structural projections) and in order to either strengthen or weaken the same in order to transfer more or less dissipating force to the reinforcing bar and surrounding structure, and relative to the other collision forces being dissipated throughout the instrument panel architecture.

In particular, and referencing FIG. 6, a partial cutaway illustration is shown at 104 of an alternate configuration, and whereby a spacing established between the glove box receptacle, i.e., its inwardly arcuately exposed end, and the reinforcement bar 28 is modified, such as by moving the bar closer (see at 28') or further (at 28) away from the opposing edge surface of the embossment/projection. Another varying parameter in the structural performance characteristics of the receptacle includes varying a selected thickness associated with a given surface of the receptacle projection (see reduced thickness inner arcuate end surface 90'), this encouraging the inner collapse of the hollowed receptacle interior to dissipate some additional force in a safe direction, as well as again to protect the user's knees from an excessive contact surface, and such as which may be imposed by the bar and rigid receptacle in cooperation.

Referring now to FIG. 7, a further partial cutaway illustration is shown at 106 of a yet further alternate configuration of the present invention. In this illustration, an impacting surface of the receptacle projecting structure, see again arcuate inner end surface 90, is inwardly notched, at 108, again to facilitate a degree of controlled collapse of the hollow interior structure concurrent with exerting a determined deforming force upon the reinforcing bar 28.

FIG. 8 is a still further partial cutaway illustration, at 109, of an additional ribbing structure, see ribs 110 and 112, as well as the honeycombed cutaway structure shown in FIG. 9 and referenced by cross ribs 114 and 116 in cooperation with the interiorly positioned ribs 110 and 112, incorporated into the otherwise hollowed interior of the receptacle projection, e.g. again at 84. The ribs are typically integrally molded within the projecting structure, and in order to selectively strengthen the interior of the receptacle structure proximate the impact point with the reinforcement bar in a situation where it is desired to maintain additional structural integrity of the rearward projection or embossment relative to the reinforcing bar 28.

Figure 10:
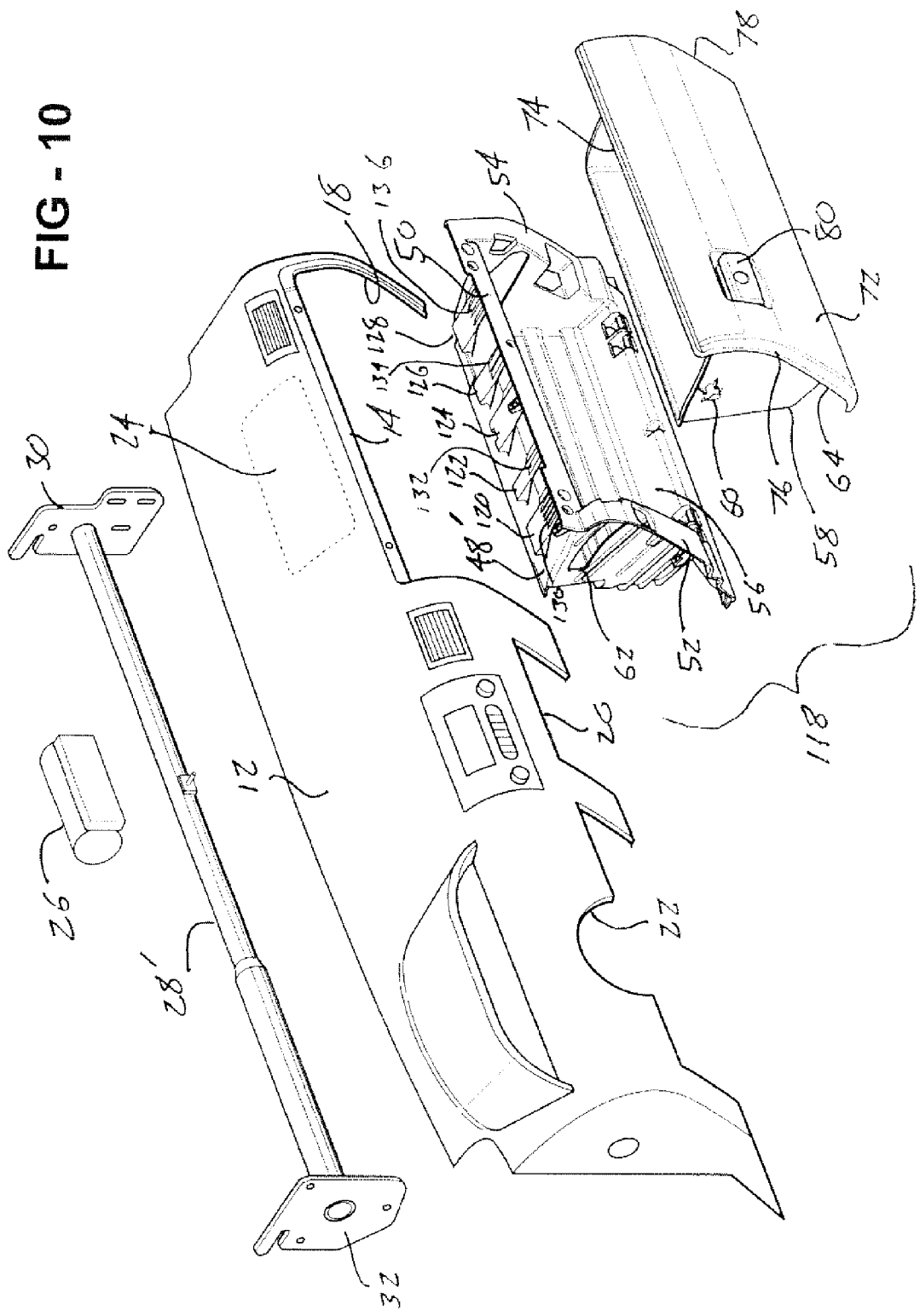
FIG. 10 is an exploded view similar to that previously shown in FIG. 1 and illustrating a reconfigured receptacle structure with removable and structural tuning ribs associated with each of a plurality of reconfigured and widthwise spaced structural embossment portions.

Referring now to FIG. 10, an exploded view is shown of another variant of reconfigured receptacle structure is referenced at 118. For purposes of ease of illustration, identical features referenced from the embodiment of FIG. 1 will be identically numbered without being repetitively described, with additional features being either successively enumerated or otherwise designated.

A modified and simplified reinforcing bar is referenced at 28' (in comparison to that shown at 28 in FIG. 1) and includes first end 30 and second end 32 brackets as also shown in FIG. 1. The brackets are welded to the bar, and which secure in turn to body locations of the vehicle (not shown), such as in particular structural locations associated with the vehicle doors.

A modification of a three-dimensional receptacle is shown at 48', similar in numerous respects to the version shown at 48 in FIG. 1, and which is secured to the instrument panel declined support surfaces 14, 16, and 18, and such that interconnecting outer rim locations 50, 52, and 54 are secured in a desired arrangement within the instrument panel geometry. The receptacle defines an inwardly open interior 56, dimensioned to receive the associated article supporting bin 58 as previously described and, along with the bin and its associated door, is constructed of a material such as polypropylene in an injection molding process.

Referencing FIG. 12 in cooperation with variant previously illustrated in FIG. 3, the door associated with the bin 48 includes an inner panel 64' which is secured against locations associated with a forward edge of the bin. As with the bin, the inner panel 64' is typically constructed of a plasticized material formed in an injection molding process and such that the panel 64' exhibits a modified/arcuate planar configuration with a specified length, width and thickness, and generally corresponding to a dimensioned opening in the vehicle dashboard.

The inner panel 64' further includes a plurality of spaced apart and projecting support/stiffening ribs 66', 68', 70', et seq. These are arranged in opposing fashion relative to an outer panel 72', corresponding in overall shape and size to the inner panel 64', and in order that the inner and outer panels are vibrationally welded together, such as along contacting edges of the ribs 66', 68', 70', et seq. against an inner surface of the outer panel 72'.

Figure 11:
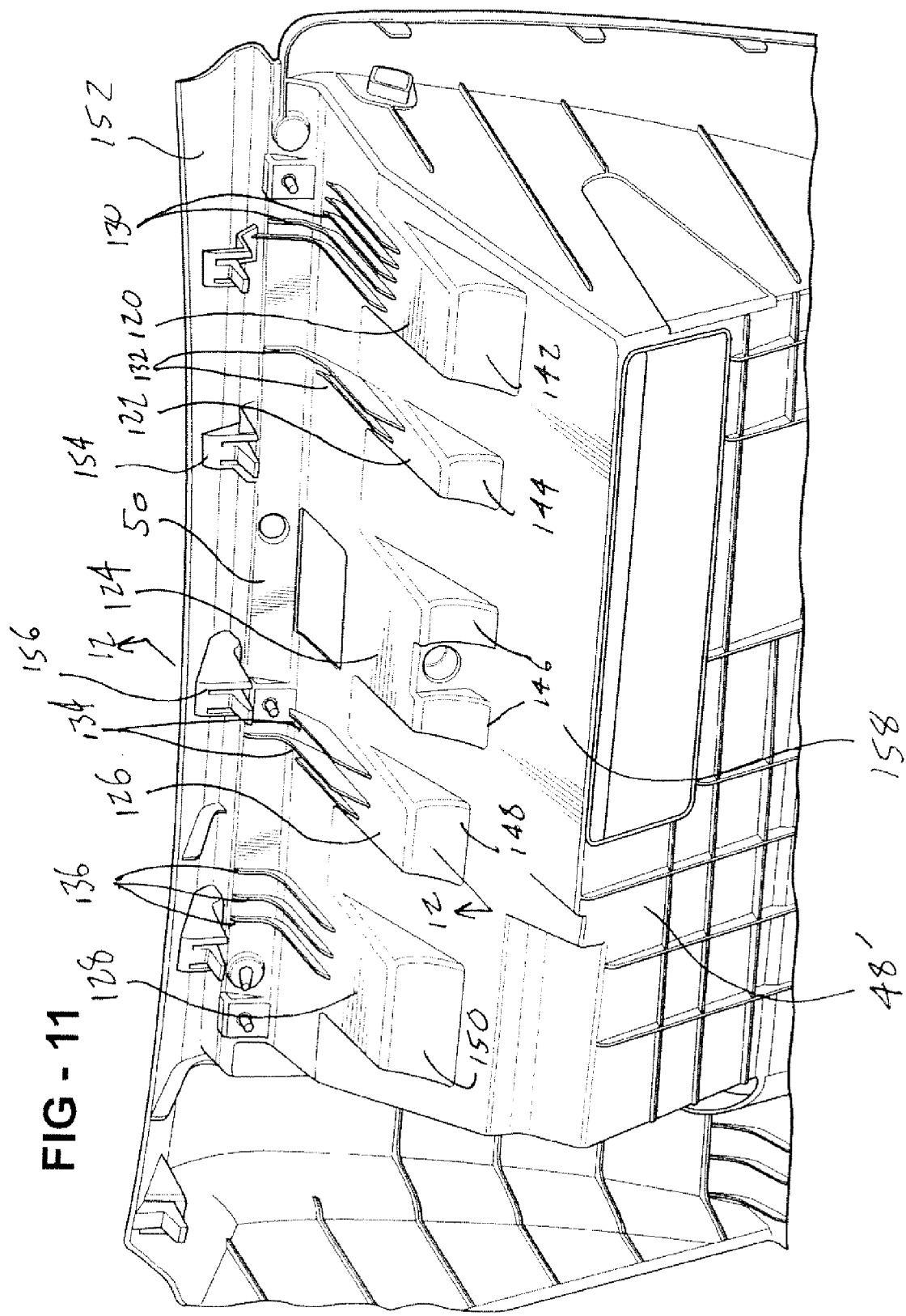
FIG. 11 is a rotated and partial perspective of the interior receptacle and better showing the structure of the integrally projecting embossments in cooperation with the individual pluralities of selectively attachable ribs for adjusting the crash safety aspects of the design.

With additional reference to FIG. 11 the rearward structural projections 84, 86, et seq. associated with the fixed and inner glove box receptacle 48 in the embodiment of FIG. 1, are substituted by a plurality of spaced apart and reconfigured structural projections 120, 122, 124, 126 and 128 positioned at forwardly extending and widthwise spaced apart locations along the top of the interior receptacle 48. Similar to the first embodiment, the projections 120-128 define integrally formed embossments which, as best shown in FIG. 12, are arranged in incrementally spaced and opposing fashion relative to the surface of the IP reinforcing bar 28'. The number and configuration of the structural projections 120-128 is adjustable and it is further understood that the variant of FIG. 10 can also be utilized with a receptacle exhibiting structural projections such as shown at 84 and 86 in the initial disclosed variant of FIG. 1.

A plurality of exterior positioned and structural tuning ribs are referenced in FIGS. 10 and 11 associated with each of the structural embossment portions 120-128. Specifically, and as best shown in FIG. 11, individual pluralities of ribs are referenced at 130 for embossment 120, at 132 for embossment 122, at 134 for embossment 126 and, finally, at 136 for embossment 128.

The ribs are arranged on the top of the receptacle 48', in established pluralities and configurations such that they adjust the degree of collapse or deformation of the selected embossment portion. Selected ribs drawn from those shown at 130-136 exhibit variable or different lengths, thickness, and forward/rearward edge configurations which, when engaged upon the upper surfaces of the embossments 120-128 and the adjoining angled inner edge of the upper rim location 50, modify the structural and deformation properties of the receptacle 48' at each widthwise locations.

As is further shown in FIG. 12, referencing in cutaway the selected rib 134 associated with the structural (e.g., embossment) portion 126, each of the ribs may be easily removable, see resistively engaging and interconnected recess channels 138 and 140 defined in the top surface of the portion 126. In this fashion, a selected number of ribs may be secured for each of the reconfigured embossment portions 122-128, and in order to adjust the degree of collapse of that associated section of the receptacle, and thereby contribute to the "tuning" of the crash safety characteristics associated with the design. The ability to quickly add or remove ribs at given structural locations further enables easier and more accurate modification to the parts for purposes of safety testing and design development.

It is also envisioned that a separate variant of the present invention can include ribs that are integrally formed with the interior receptacle and according to a selected number and individual configuration. Other variants can include a receptacle structure exhibiting a minimal number of integrally formed ribs associated with one or more of the embossments, with additional ribs being selectively engaged or removed from each embossment in order to "tune" the crash safety parameters of the structure at that location.

Another varying parameter in the structural performance characteristics of the receptacle includes varying a selected thickness associated with a given surface of the receptacle projection (see reduced thickness inner arcuate end surfaces 142, 144, 146, 148 and 150 as shown in FIG. 11 for each of the embossment portions 120, 122, 124, 126 and 128, respectively), this encouraging the inner collapse of the hollowed receptacle interior to dissipate some additional force in a safe direction, as well as again to protect the user's knees from an excessive contact surface, and such as which may be imposed by the bar and rigid receptacle in cooperation.

Additional features, as shown in FIGS. 11 and 12, include an upper fascia strip 152 secured to the upper rim 50 of the receptacle 48'. As best shown in FIG. 11, the fascia piece 152 can include such as brackets or clips (examples at 154 and 156) for ensuring that the fascia is secured attached to locations of the rim 50 and in order to provide the completed IP assembly with an attractive and seamless appearance.

Referring once again to FIGS. 11 and 12, the upper surface of the interior receptacle 48' leading away from the open face rim locations 50, 52, and 54 is further referenced by a configured lower surface 158, this in cooperation with the inner arcuate surfaces 142-150 providing an optimal impact configuration for establishing controlled collapsing relative the reinforcing bar 28'. This configuration is further modifiable in order to also provide a desired degree of slippage permitting motion of the receptacle 48' relative to the bar 28', and as shown by arrow 158, in response to a knee force application 160 indicative of a crash condition, and in order to provide another possible parameter for adjusting or tuning the crashworthiness of the assembly.

The ability to alternately configure, reposition and vary a number of and arrangement of the exterior ribs 130, 132, 134 and 136 is further useful in the crash testing of vehicles for the purposes of achieving optimal safety characteristics. In this fashion, the ability to easily and quickly adjust a desired degree of force absorbing deformation or collapsibility of the interior receptacle and selected widthwise locations associated with each of the structural projections results in achieving an optimal impact force transfer from the passenger's knees directly to the glove box assembly and reinforcing bar, thereby limiting the incidences of passenger injury as a result of a head on collision event.

Having described my invention, other and additional preferred embodiments will become apparent to those skilled in the art. In particular, it is envisioned that the relative dimensions and structural integrity of one or more of the rearward projections/embossments may be varied to distribute collision forces in a given direction. It is also envisioned that the structural makeup and construction of the receptacle extending projections may otherwise be modified in any manner calculated to augment or coordinate with the force deforming capabilities provided by the surrounding instrument pane

We claim:

1. A glove box assembly mounted within a vehicle instrument panel and, upon experiencing a collision event, deforming a reinforcing bar associated with the instrument panel following initial forward travel of the glove box to engage the reinforcement bar, said assembly comprising:
    an open receptacle fixedly mounted within the instrument panel, said receptacle including at least one structural projection extending in a direction towards the reinforcing bar;
    at least one rib extending outwardly from an exterior of said structural projection, said at least one rib controlling deformation of the structural projection adjusting a deformation characteristic associated with said structural projection; and
    a bin supported within said fixed receptacle and to which is secured a door for selectively pivoting said bin both into and from within said fixed receptacle.

2. The glove box assembly as described in claim 1, said receptacle further comprising an injection molded body, a facing edge of said structural projection opposing the reinforcing bar exhibiting an inward arcuate profile.

3. The glove box assembly as described in claim 2, further comprising a plurality of individual structural projections arranged in spaced apart and opposing fashion relative to the reinforcing bar, a plurality of ribs being secured upon each of said structural portions and extending to locations associated with an inner rim of said receptacle.

4. The glove box assembly as described in claim 3, each of said ribs further comprising a variable length and thickness with both forward and rearward edge configurations.

5. The glove box assembly as described in claim 4, further comprising channels defined in a top surface of each of said structural portions for resistively engaging said configured ribs.

6. The glove box assembly as described in claim 2, further comprising a thickness associated with a selected surface of said structural projection being modified relative to an interconnecting surface.

7. The glove box assembly as described in claim 2, said inward arcuate profile being notched to facilitate a degree of controlled collapse of the hollow interior structure, concurrent with exerting a determined deforming force upon the reinforcing bar.

8. The glove box assembly as described in claim 1, further comprising at least one interior rib incorporated into an otherwise hollowed interior of said glove box receptacle, and in order to selectively strengthen said receptacle structure impacting the reinforcement bar.

9. The glove box assembly as described in claim 1, further comprising an exposed surface in said door within which is mounted a handle mechanism.

10. The glove box assembly as described in claim 1, further comprising hinge supports extending along a lower surface of said bin and which are adapted to secure said bin in pivoting fashion within the instrument panel.

11. The glove box assembly as described in claim 1, said bin further comprising at least one side projecting support adapted to contact the dash upon outward pivoting of the glove box and in order to define a fully opened condition.

12. The glove box assembly as described in claim 1, each of inner and outer panels comprising said door having a specified shape and size and being vibration welded together.

13. The glove box assembly as described in claim 1, each of said bin, door and receptacle each having a specified shape and size and being constructed of a plasticized material in an injection molded process.

14. A glove box assembly incorporated into a vehicle instrument panel along which extends a reinforcing bar, said assembly comprising:
   an open receptacle fixedly mounted within the instrument panel, said receptacle including a plurality of individual structural projections arranged in spaced apart and opposing fashion relative to the reinforcing bar, a plurality of ribs being secured upon each of said structural portions and extending to locations associated with an inner rim of said receptacle, each of said ribs including a variable length and thickness with both forward and rearward edge configurations; and
   a bin secured within said receptacle and including a door exposed to adjoining surfaces of the instrument panel;
   upon experiencing a collision event resulting in a passenger's knees impacting the door, inward deformation of said receptacle transferring forces to the instrument panel and deforming the reinforcing bar.

15. The assembly as described in claim 12, said receptacle further comprising an injection molded body, a facing edge of said structural projections opposing the reinforcing bar exhibiting an inward arcuate profile.

16. The glove box assembly as described in claim 14, further comprising channels defined in extending fashion along at least one top interconnecting surface of each of said structural portions and for resistively engaging said configured ribs.

17. The glove box assembly as described in claim 14, each of said structural projections further comprising an inward arcuate profile opposing the reinforcing bar and being notched to facilitate a degree of controlled collapse of the hollow interior structure, concurrent with exerting a determined deforming force upon the reinforcing bar.

18. The glove box assembly as described in claim 12, further comprising at least one interior rib incorporated into an otherwise hollowed interior of said glove box receptacle to selectively strengthen said receptacle structure impacting the reinforcement bar.

19. A glove box assembly incorporated into a vehicle instrument panel along which extends a reinforcing bar, said assembly comprising:
   a three-dimensional and interiorly open receptacle fixedly mounted within the instrument panel, said receptacle including a plurality of individual structural projections arranged in spaced apart and opposing fashion relative to the reinforcing bar;
   a plurality of ribs being secured upon each of said structural portions and extending to locations associated with a rim of said receptacle, each of said ribs further comprising a variable length and thickness with both forward and rearward edge configurations;
   a plurality of channels defined in extending fashion along at least one top interconnecting surface of each of said structural portions and for resistively engaging said configured ribs to provide selected and varying degrees of reinforcing and collapse resistant support to said structural portions; and
   a bin secured within said receptacle and including a door exposed to adjoining surfaces of the instrument panel;
   upon experiencing a collision event resulting in a passenger's knees impacting the door, a controlled inward deformation of said receptacle is regulated by the positioning and configuration of said ribs, transferring forces to the instrument panel and deforming the reinforcing bar.

* * * * *